United States Patent
Chen et al.

(10) Patent No.: US 11,384,897 B2
(45) Date of Patent: Jul. 12, 2022

(54) LINKAGE TYPE LIFTING MAST AND ITS SYSTEM

(71) Applicant: SHANG RUI FENG CO., LTD., Taichung (TW)

(72) Inventors: Chiung-Chang Chen, Taichung (TW); Wen-Tsan Chen, Taichung (TW)

(73) Assignee: SHANG RUI FENG CO., LTD., Taichung (TW)

( * ) Notice: Subject to any disclaimer, the term of this patent is extended or adjusted under 35 U.S.C. 154(b) by 0 days.

(21) Appl. No.: 17/464,974

(22) Filed: Sep. 2, 2021

(65) Prior Publication Data
US 2022/0090732 A1 Mar. 24, 2022

(30) Foreign Application Priority Data

Sep. 24, 2020 (TW) .................................. 109133120

(51) Int. Cl.
*F16M 11/28* (2006.01)
*F16B 7/10* (2006.01)

(52) U.S. Cl.
CPC ............... *F16M 11/28* (2013.01); *F16B 7/10* (2013.01)

(58) Field of Classification Search
CPC . F16M 11/28; F16B 7/10; F16B 7/105; E04H 12/00; E04H 12/182; F21V 321/22
See application file for complete search history.

(56) References Cited

U.S. PATENT DOCUMENTS

| 4,062,156 | A | * | 12/1977 | Roth | F16B 7/105 343/903 |
| 4,594,824 | A | * | 6/1986 | Ziegler | F21V 21/22 52/118 |
| 7,497,140 | B2 | * | 3/2009 | Blackwelder | F16H 25/2056 52/118 |
| 8,413,390 | B2 | * | 4/2013 | Pereira | F16B 7/105 343/883 |
| 10,527,141 | B2 | * | 1/2020 | Huebner | F16H 25/2015 |
| 2019/0003562 | A1 | | 1/2019 | Hawksworth | |

FOREIGN PATENT DOCUMENTS

| CN | 102491217 A | 6/2012 |
| CN | 102951573 A | 3/2013 |
| CN | 111049316 A | 4/2020 |
| TW | M459317 U1 | 8/2013 |
| TW | M460176 U1 | 8/2013 |

* cited by examiner

*Primary Examiner* — Anita M King
(74) *Attorney, Agent, or Firm* — Birch, Stewart, Kolasch & Birch, LLP (57) ABSTRACT

A lifting mast includes a bottom layer component set, a first moving component set and a second moving component set. with the technical feature that plural balls are embedded between the screw hole of the first moving base of the first moving component set and the threaded section of the bottom linkage rod of the bottom layer component set and the technical feature that plural balls are embedded between the second moving base of the second moving component set and the threaded section of the hollow connecting rod of the first moving component set, when the hollow connecting rod of the first moving component set is screwed to the bottom linkage rod of the bottom layer component set and is linked by the rotation of the bottom linkage rod, it is smoother.

16 Claims, 6 Drawing Sheets

LINKAGE TYPE LIFTING MAST AND ITS SYSTEM

BACKGROUND OF THE INVENTION

1. Field of the Invention

The present invention relates to lifting mast technology, and more particularly to a linkage type lifting mast and its system.

2. Description of the Related Art

Nowadays, the use of lifting masts is very wide, and when necessary, it needs to be stretched upward to raise its top to a high place. For example: lighting equipment for firefighting and disaster relief, mobile communication stations, news gathering vehicles, etc., all need to install antennas or other lines by lifting masts, so that the lines can be smoothly extended upwards and downwards for easy folding.

For example, in the case of the Republic of China New Patent Publication No. TWM460176U No. B (the following reference numbers refer to the reference numbers listed in the embodiment of the aforementioned patent case), the "linked lifting mast" disclosed comprises a bottom layer component set 20, a first moving component set 30 and a second moving component set 40. The bottom layer component set 20 comprises a base 22, a support tube 24 connected to the base 22, and an active rod 26 rotatably provided on the base 22 and located in the support tube 24. The first moving component set 30 comprises a first moving base 32 screwed to the active rod 26, a first moving tube 34 connected to the first moving base 32, and a first hollow rod 36 rotatably arranged on the first moving seat 32 and located in the first moving tube 34. The first moving component set 30 can be driven by the active rod 26 to move linearly and set in the support tube 24. The first hollow rod 36 can be driven by the active rod 26 and rotatably sleeved on the active rod 26. The second moving component set 40 comprises a second moving base 42 screwed to the first hollow rod 36 and a second moving tube 44 connected to the second moving base 42. The second moving component set 40 can be driven by the first hollow rod 36 to move linearly and set in the first moving tube 34.

With this, when the active rod 26 of the bottom layer component set 20 starts to rotate, the first moving component set 30 is linked by the active rod 26 to produce an upward or downward linear movement in the support tube 24, and the first hollow rod 36 of the first moving component set 30 is also affected by the active rod. 26's linkage also produces upward or downward movement. At this time, the second moving component set 40 also moves up or down due to the linkage of the first hollow rod 36 of the first moving component set 30. However, although the technical characteristics of the linked lifting mast and its various components disclosed above can achieve the effect of almost synchronous upward expansion or downward folding, however, because the active rod 26 of the bottom layer component set 20, the first hollow rod 36 of the first moving component set 30 and the second moving component set 40 are not supported or connected by auxiliary components, it is not smooth when extending upwards or folding downwards, which affects the process of erecting antennas or other lines.

Therefore, how to overcome the technical shortcomings mentioned above and effectively improve the process of erecting antennas or other circuits is the objective of the present invention.

SUMMARY OF THE INVENTION

The present invention has been accomplished under the circumstances in view. It is the main object of the present invention to provide a linkage type lifting mast. The technical features of adding a plurality of balls between the various layers of the lifting mast can greatly improve the unsmooth phenomenon when extending upwards or retracting downwards as mentioned in the previous technology, and effectively improve the efficiency of the process when installing antennas or other lines.

To achieve this and other objects of the present invention, the lifting mast comprises a bottom layer component set, a first moving component set and a second moving component set. The bottom layer component set comprises a base, a support tube, a bottom linkage rod, an inner bushing and an outer bushing. The bottom linkage rod is set on the base. The support tube is sleeved on the bottom linkage rod with a bottom end thereof set on the base. The support tube has the inner peripheral wall thereof provided with a guide rail that extends from the support tube along the axis of the support tube near the base. The bottom linkage rod comprises a threaded section located on an outer surface thereof. The inner bushing of the bottom layer component set is set at the top of the support tube with the bottom end thereof set in the support tube. The outer bushing of the bottom layer component set is set on a top of the inner bushing of the bottom layer component set and the outer peripheral wall of the support tube. The first moving component set comprises a first moving base, a first moving tube, a hollow connecting rod and a plurality of balls. The first moving base is provided with a screw hole to be screwed to the threaded section of the bottom linkage rod of the bottom layer component set. The balls of the first moving component set are set between the screw hole of the first moving base of the first moving component set and the threaded section of the bottom linkage rod of the bottom layer component set. The first moving tube leans against the first moving base. The first moving base has the outer peripheral wall thereof recessed to form a guide groove. The guide groove is embedded in the guide rail of the support tube of the bottom layer component set. The hollow connecting rod is set and screwed to the threaded section of the bottom linkage rod of the bottom layer component set and linked by the rotation of the bottom linkage rod. The hollow connecting rod has the bottom end thereof set in the first moving base. The first moving tube is provided with a guide rail at the inner peripheral wall thereof. The guide rail of the first moving tube extends from the first moving base along the axis of the first moving tube. The hollow connecting rod comprises a threaded section located on the outer surface thereof. The first moving tube of the first moving component set is set through the outer bushing and the inner bushing of the bottom layer component set and abuts on the first moving base. The second moving component set comprises a second moving base, a second moving tube and a plurality of balls. The second moving base is provided with a screw hole and used to screw the threaded section of the hollow connecting rod of the first moving component set. The balls of the second moving component set are set between the screw hole of the second moving base of the second moving component set and the threaded section of the hollow connecting rod of the first moving component set. The second moving tube abuts against the second moving base. The second moving base has the outer peripheral wall thereof recessed to form a guide groove. The guide groove is embedded in the guide rail of the first moving tube of the first moving component set. Therefore, the technical feature of adding a plurality of balls between the layers of the lifting mast can effectively improve the efficiency of the process when erecting antennas or other lines.

The present invention further provides a linkage type lifting mast system, which comprises a control unit and a lifting mast as mentioned above. The control unit comprises a microcontroller, a motor and a linkage assembly. The microcontroller of the control unit is electrically connected to and controls the motor. The motor is connected to the linkage assembly. The linkage assembly comprises a connecting rod, a linking member and an offset gear. The connecting rod has one end thereof connected to the motor. The linking member is connected to the other end of the connecting rod and the offset gear. The bottom linkage rod of the bottom layer component set of the lifting mast meshes with the offset gear of the linkage assembly of the control unit. The microcontroller electrically controls the motor to operate, so that the connecting rod of the linkage assembly drives the linking member and the offset gear to operate, in turn, the bottom linkage rod of the bottom layer component set of the lifting mast is electrically controlled by the microcontroller of the control unit to operate. Therefore, through the control unit to electrically control the synchronous operation of each layer of the lifting mast, the lifting mast is electrically controlled to show the synchronous extension and contraction movement mechanism and its effects.

The detailed structure, characteristics, assembly or use of the present invention will be described in the detailed description of the subsequent implementation. However, those with ordinary knowledge in the field of the present invention should be able to understand that the detailed description and specific embodiment listed in the implementation of the present invention are only used to illustrate the present invention, and are not intended to limit the scope of the patent application of the present invention.

DETAILED DESCRIPTION OF THE INVENTION

The applicant first explains here that throughout the specification, including the embodiment described below and the claims in the scope of the patent application, the nouns related to directionality are based on the directions in the drawings. Secondly, in the embodiment and drawings that will be introduced below, the same element numbers represent the same or similar elements or their structural features.

Please refer to FIGS. 1 to 5 first, which are a linkage type lifting mast system 1 disclosed in a preferred embodiment of the present invention, which comprises a control unit 100 and a lifting mast 200. The control unit 100 comprises a microcontroller 10, a motor 20 and a linkage assembly 30. The lifting mast 200 comprises a bottom layer component set 40, a first moving component set 50 and a second moving component set 60.

Figure 1:
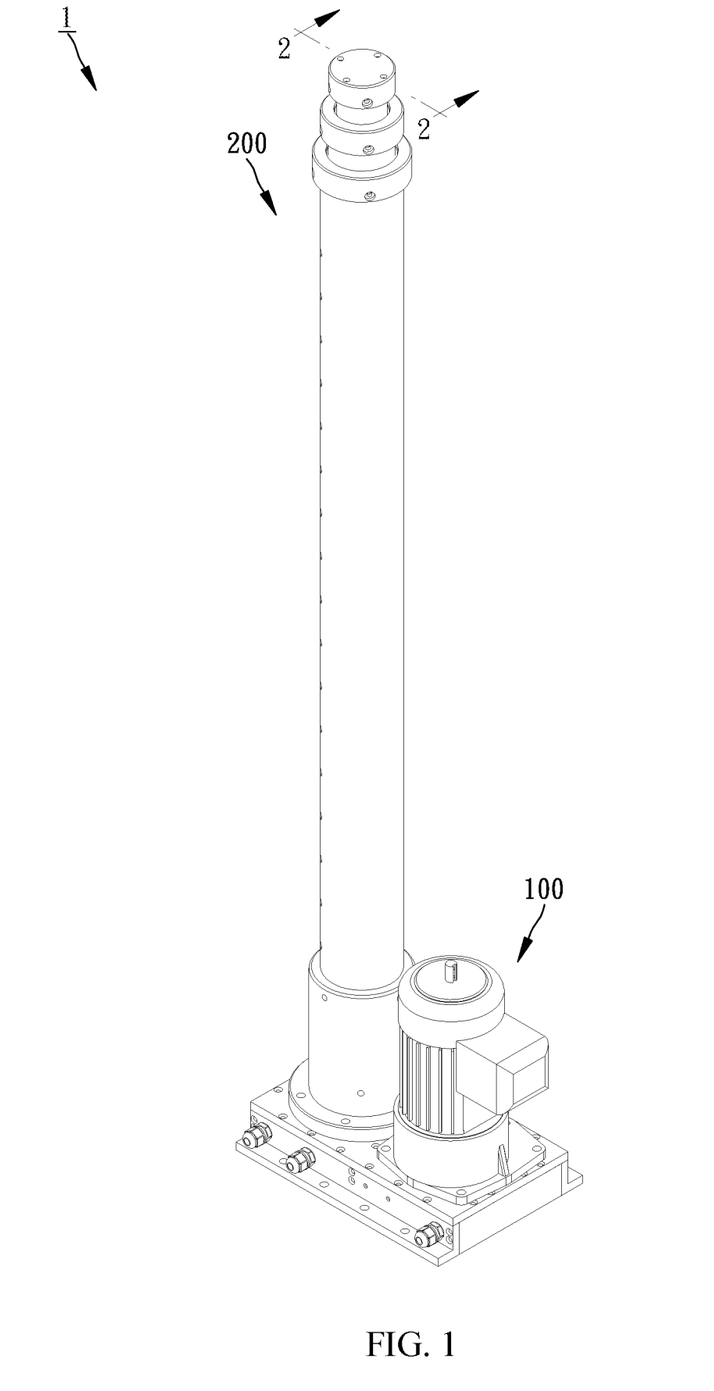
FIG. 1 is an oblique top elevational view of a linkage type lifting mast system in accordance with the present invention.
Figure 2:
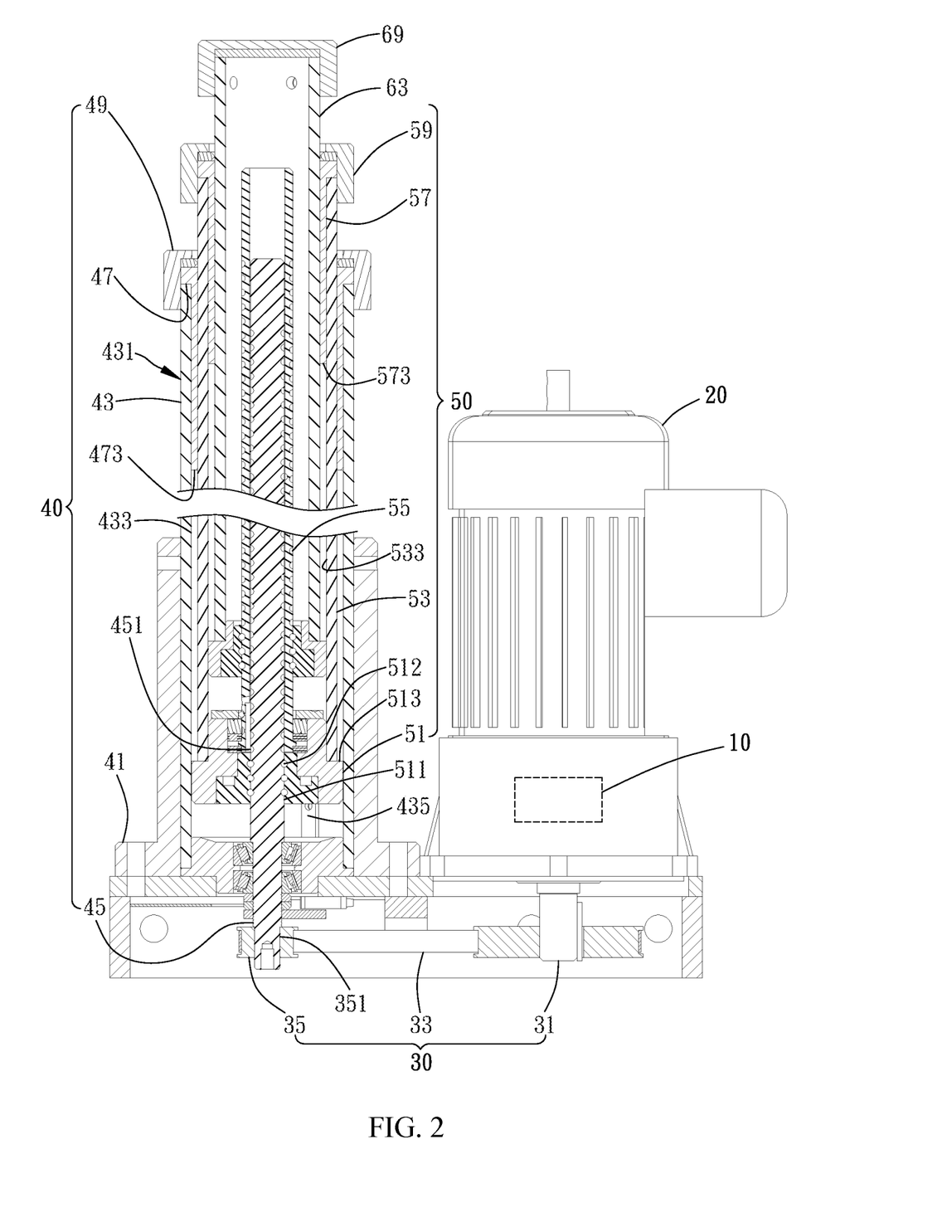
FIG. 2 is a cross-sectional front view taken along line 2-2 of FIG. 1, which mainly reveals the state of the lifting mast when it is folded.

Please refer to FIG. 1 and FIG. 2 together. The microcontroller 10 of the control unit 100 is electrically connected to and controls the motor 20. The motor 20 is connected to the linkage assembly 30. The linkage assembly 30 comprises a connecting rod 31, a linking member 33 (in this embodiment, the linking member 33 is a pulley), and an offset gear 35. One end of the connecting rod 31 is connected to the motor 20. The linking member 33 is respectively connected to the other end of the connecting rod 31 and the offset gear 35. The control unit 100 electrically controls the motor 20 to generate forward or reverse rotation through the microcontroller 10, so that the connecting rod 31 of the linkage assembly 30 drives the linking member 33 and the offset gear 35 to generate forward or reverse rotation.

Please refer to FIG. 2 to FIG. 6. The bottom layer component set 40 of the lifting mast 200 comprises a base 41, a support tube 43, a bottom linkage rod 45, an inner bushing 47 and an outer bushing 49. The bottom linkage rod 45 is set at the base 41 with the bottom end thereof engaged with the inner peripheral wall 351 of the offset gear 35 of the linkage assembly 30 of the control unit 100. The bottom linkage rod 45 of the bottom layer component set 40 of the lifting mast 200 is electrically controlled by the microcontroller 10 of the control unit 100, so that the motor 20 can rotate forward or backward, and the offset gear 35 of the linkage assembly 30 also produces forward or reverse rotation, which in turn causes the bottom linkage rod 45 to rotate clockwise or counterclockwise. The outer surface of the bottom linkage rod 45 is provided with a threaded section 451, and the length of the threaded section 451 is less than or equal to the axial length of the bottom linkage rod 45. The support tube 43 is sleeved on the bottom linkage rod 45, and the bottom end of the support tube 43 is set on the base 41. The inner bushing 47 is sleeved on the top of the support tube 43, so that a bottom end 473 of the inner bushing 47 is set in the support tube 43. The outer bushing 49 is sleeved on the top of the inner bushing 47 and the outer peripheral wall 431 of the support tube 43. The inner peripheral wall 433 of the support tube 43 is provided with two oppositely arranged guide rails 435, and the two guide rails 435 extend from a position close to the base 41 and along the axial direction of the tube body of the support tube 43. Preferably, the two guide rails 435 respectively abut the bottom end 473 of the inner bushing 47. It is worth mentioning that the inner peripheral wall 433 of the support tube 43 can also be equipped with only one guide rail 435.

Please refer to FIG. 2 to FIG. 6. The first moving component set 50 of the lifting mast 200 comprises a first moving base 51, a first moving tube 53, a hollow connecting rod 55, an inner bushing 57 and an outer bushing 59. The center of the first moving base 51 has a through screw hole 511 for screwing the threaded section 451 of the bottom linkage rod 45 of the bottom layer component set 40. A plurality of balls 512 are embedded in the wall of the screw hole 511 of the first moving base 51, so that the first moving base 51 can smoothly reciprocate on the threaded section 451 of the bottom linkage rod 45 through the plurality of balls 512. The outer edge of the first moving base 51 protrudes to form a annular protrusion 513, and the outer diameter of the annular protrusion 513 is less than or equal to the inner diameter of the support tube 43 of the bottom layer component set 40. After the first moving tube 53 passes through the outer bushing 49 of the bottom layer component set 40 and the inner bushing 47 in sequence, the bottom end of the first moving tube 53 abuts against the annular protrusion 513 of the first moving base 51. The outer peripheral wall of the first moving base 51 is recessed to form two guide grooves 515, which are respectively corresponding and embedded in the positions of the two guide rails 435 of the support tube 43 of the bottom layer component set 40. It is worth mentioning that the outer peripheral wall 531 of the first moving base 51 may also be recessed with only one guide groove 515 to correspond to and be embedded in the guide rail 435 of the inner peripheral wall 433 of the support tube 43. The hollow connecting rod 55 of the first moving component set 50 is sleeved and screwed to the threaded section 451 of the outer surface of the bottom linkage rod 45 of the bottom layer component set 40, and the bottom end of the hollow connecting rod 55 is set on the first moving base 51. The inner bushing 57 is set on the top of the first moving tube 53, so that the bottom end 573 of the inner bushing 57 is set in the first moving tube 53. The outer bushing 59 is set at the top of the inner bushing 57 and the outer peripheral wall 531 of the first moving tube 53. The inner peripheral wall 533 of the first moving tube 53 is provided with two relatively disposed guide rails 535, and the two guide rails 535 extend from a position close to the first moving base 51 along the tube axis of the first moving tube 53. Preferably, the two guide rails 535 are respectively abutting the bottom end 573 of the inner bushing 57. It is worth mentioning that the inner peripheral wall 533 of the first moving tube 53 can also be provided with only one guide rail 535. Therefore, when the bottom linkage rod 45 rotates clockwise or counterclockwise, the hollow connecting rod 55 will also be driven by the bottom linkage rod 45 and synchronously rotate clockwise or counterclockwise accordingly. At this time, through the technical feature that the two guide rails 435 embedded in the support tube 43 of the bottom layer component set 40 through the two guide grooves 515 of the first moving base 51 respectively, the first moving base 51 can move upward or downward along the setting direction of the two guide rails 435 of the support tube 43. The outer surface of the hollow connecting rod 55 is provided with a threaded section 551, and the length of the threaded section 551 is less than or equal to the axial length of the hollow connecting rod 55.

Figure 3:
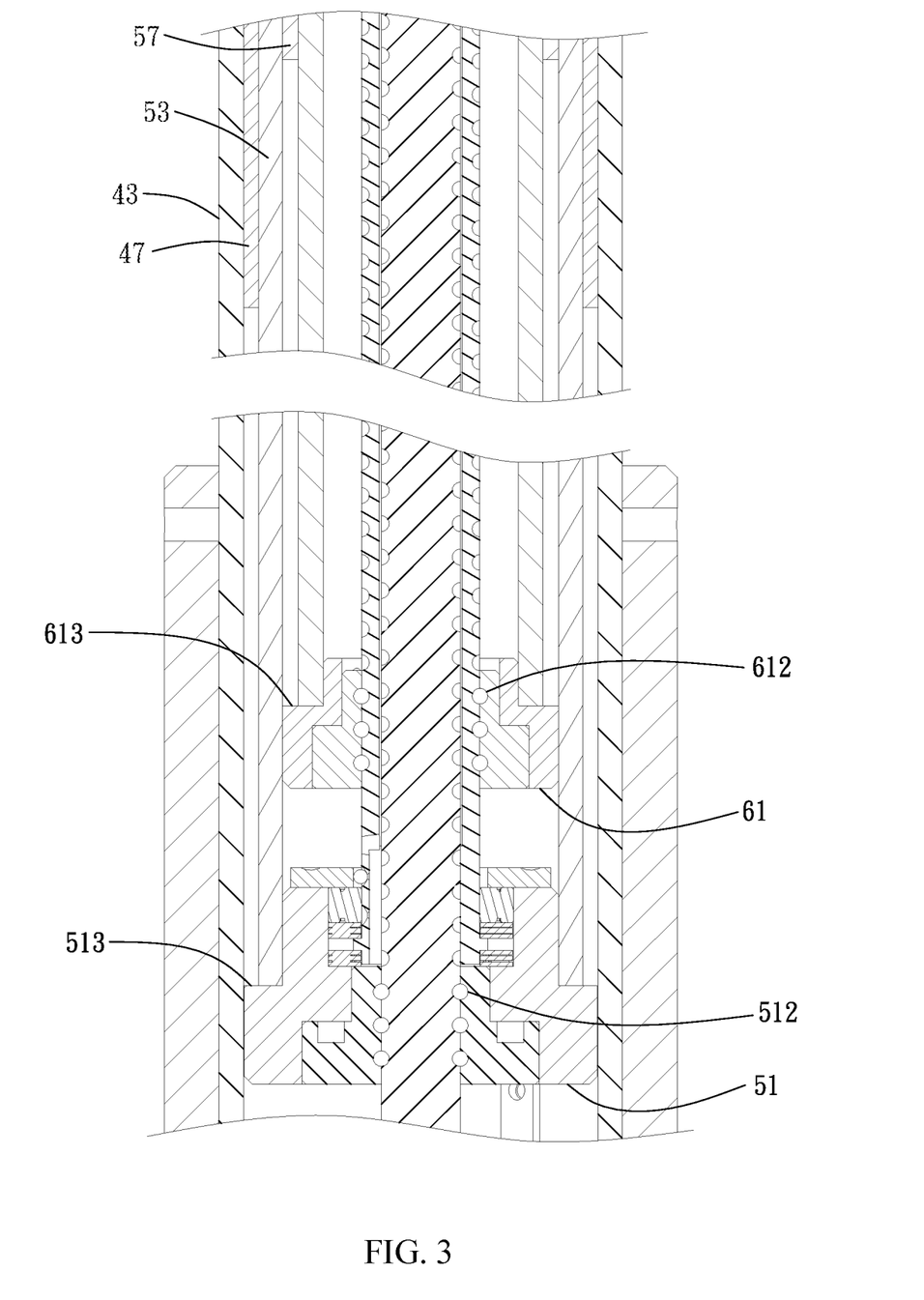
FIG. 3 is an enlarged view of a part of FIG. 2.
Figure 4:
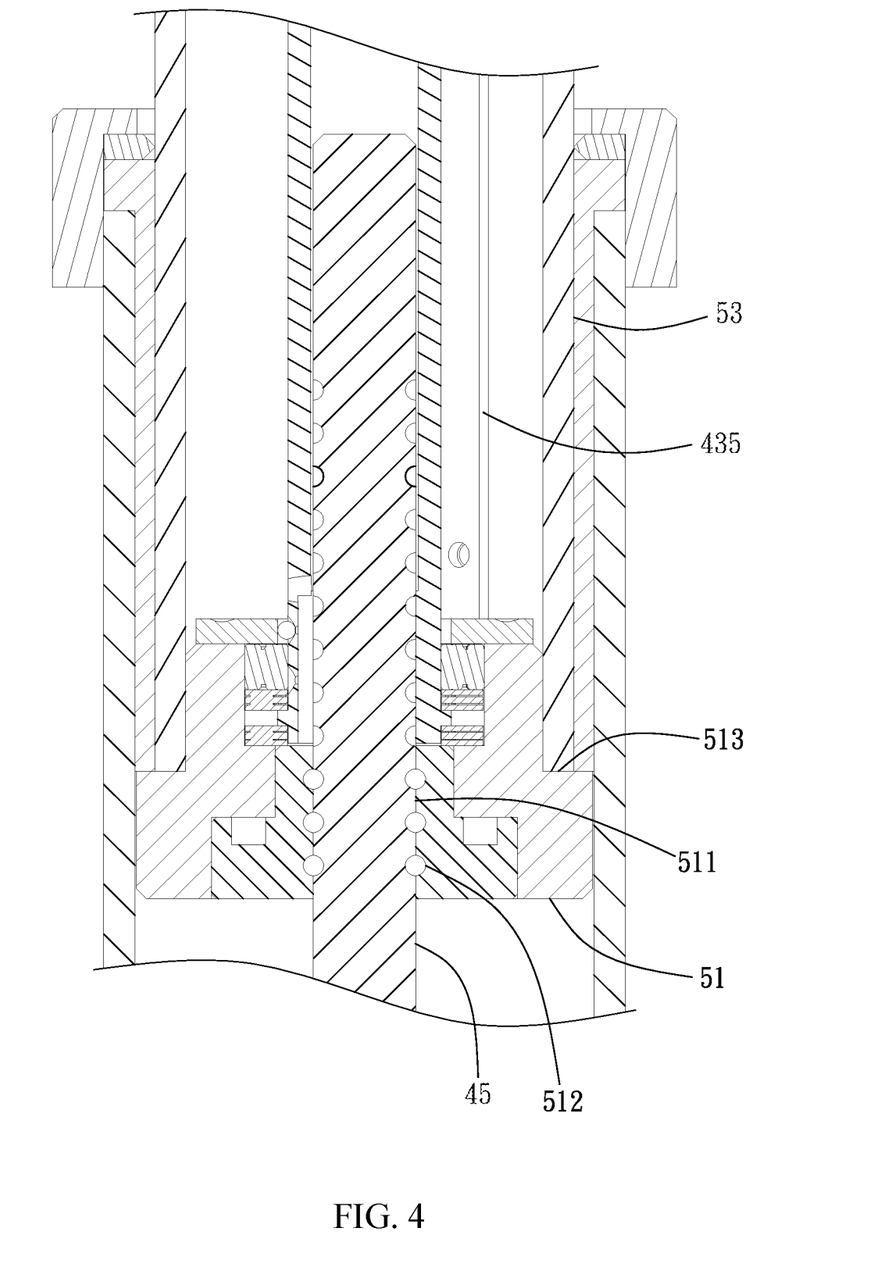
FIG. 4 is an enlarged and cross-sectional schematic diagram of part of the components of FIG. 2, which mainly exposes the connection relationship between the guide groove of the first moving component set and the guide rail of the bottom layer component set.

Please refer to FIG. 2 and FIG. 3. The structure of the second moving component set 60 of the lifting mast 200 is similar to the first moving component set 50, comprising a second moving base 61, a second moving tube 63 and an outer bushing 69. The center of the second moving base 61 has a through screw hole 611, which is used to screw the threaded section 551 of the hollow connecting rod 55 of the first moving component set 50. A plurality of balls 612 are embedded in the hole wall of the screw hole 611 of the second moving base 61, so that the second moving base 61 can reciprocate smoothly on the threaded section 551 of the hollow connecting rod 55 through the plurality of balls 612. The outer edge of the second moving base 61 protrudes to form an annular protrusion 613, and the outer diameter of the annular protrusion 613 is less than or equal to the inner diameter of the first moving tube 53 of the first moving component set 50. The second moving tube 63 is passed through the outer bushing 59 of the first moving component set 50 and the inner bushing 57 in sequence, so that the bottom end of the second moving tube 63 abuts against the annular protrusion 613 of the second moving base 61. The outer peripheral wall of the second moving base 61 is recessed to form two guide grooves 615, which are respectively corresponding to and embedded in the positions of the two guide rails 535 of the first moving tube 53 of the first moving component set 50. It is worth mentioning that the outer peripheral wall of the second moving base 61 can also be recessed with only one guide groove 615 to correspond to and be embedded in the guide rail 535 of the inner peripheral wall 533 of the first moving tube 53. The outer bushing 69 is set on the outer peripheral wall 631 of the second moving tube 63. Therefore, when the bottom linkage rod 45 rotates clockwise or counterclockwise, the hollow connecting rod 55 will also be driven by the bottom linkage rod 45 and synchronously rotate clockwise or counterclockwise accordingly. At this time, through the technical feature that the two guide rails 535 embedded in the first support tube 53 of the first moving component set 50 through the two guide grooves 615 of the first moving base 51 respectively, the first moving base 51 can move upward or downward along the setting direction of the two guide rails 435 of the support tube 43, the second moving base 61 can move up or down along the direction in which the two guide rails 535 of the first moving tube 53 are arranged.

The above is the technical feature of each component in the linkage type lifting mast system 1 disclosed in the preferred embodiment of the present invention, and the action method and the effect to be achieved are described below.

First, the linkage type lifting mast system 1 has an electrical control mechanism for the lifting mast 200 to exhibit synchronous extension and contraction. Please refer to FIGS. 1 to 5 together. When using the linkage type lifting mast system 1 disclosed in the present invention, first, the control unit 100 is electrically activated, so that the microcontroller 10 electrically controls the motor 20 to run, making the connecting rod 31 of the linkage assembly 30 drive the linking member 33 and the offset gear 35 to also operate, and making the bottom linkage rod 45 of the bottom layer component set 40 of the lifting mast 200 meshed with the offset gear 35 also produce clockwise or counterclockwise rotation (in this embodiment, turning clockwise is an example to make the mast extend upward as a whole, and rotating counterclockwise is to make the mast as a whole fold downwards). The hollow connecting rod 55 of the first moving component set 50 also rotates in synchronization with the rotation cycle of the bottom linkage rod 45 of the bottom layer component set 40. At this time, since the two guide grooves 515 of the first moving base 51 of the first moving component set 50 correspond to and are embedded in the positions of the two guide rails 435 of the support tube 43 of the bottom layer component set 40, and the two guide grooves 615 of the second moving base 61 of the second moving component set 60 respectively correspond to and are embedded in the positions of the two guide rails 535 of the first moving tube 53 of the first moving component set 50, therefore, when the hollow connecting rod 55 of the first moving component set 50 rotates in synchronization with the rotation period of the bottom linkage rod 45 of the bottom layer component set 40, the first moving base 51 of the first moving component set 50 and the second moving base 61 of the second moving component set 60 respectively move according to the setting direction of the two guide rails 435 of the bottom layer component set 40 and the setting direction of the two guide rails 535 of the first moving component set 50, and at the same time, they respectively drive the first moving tube 53 of the first moving component set 50 and the second moving tube 63 of the second moving component set 60 to simultaneously extend upward or retract downward. In this way, it is used to electrically control the lifting mast 200 and make it show the effect of synchronous stretching or folding motion mechanism.

Second, the linkage type lifting mast system 1 has a component that improves the performance during stretching and folding exercises. That is, please refer to FIGS. 2 to 5 together, with the technical feature that the plural balls 512 are embedded between the screw hole 511 of the first moving base 51 of the first moving component set 50 and the threaded section 451 of the bottom linkage rod 45 of the bottom layer component set 40 and the technical feature that the plural balls 612 are embedded between the second moving base 61 of the second moving component set 60 and the threaded section 551 of the hollow connecting rod 55 of the first moving component set 50, it lets the first moving base 51 and the second moving base 61 move smoothly on the threaded section 451 of the bottom linkage rod 45 and the threaded section 551 of the hollow connecting rod 55 by the plural balls 512 and the plural balls 612 respectively. Preferably, a layer of lubricating fluid can be applied to the outer surface of the plural balls 512, 612, so that the first moving base 51 and the second moving base 61 are respectively more smoothly reciprocated on the threaded section 451 of the bottom linkage rod 45 and the threaded section 551 of the hollow connecting rod 55 by the plural balls 512, 612. In this way, it is used to improve the performance of the linkage type lifting mast system 1 during stretching and folding exercises.

Third, the linkage type lifting mast system 1 has a mechanism to prevent separation of the protective components. That means, please refer to FIG. 1 and FIG. 5 together, the control unit 100 is electrically activated, so that the microcontroller 10 electrically controls the motor 20 to operate, making the first moving base 51 of the first moving component set 50 and the second moving base 61 of the second moving component set 60 move upwards in synchronization with the axis of the bottom linkage rod 45 of the bottom layer component set 40 and the hollow connecting rod 55 of the first moving component set 50 respectively, and making the first moving tube 53 and the second moving tube 63 gradually extend upwards respectively, until the first moving base 51's annual protrusion 513 abuts the bottom end 473 of the inner bushing 47 of the bottom layer component set 40, or until the annular protrusion 613 of the second moving base 61 abuts the bottom end 573 of the inner bushing 57 of the first moving component set 50. Therefore, the first moving component set 50 and the second moving component set 60 will be respectively limited to the support tube 43 of the bottom layer component set 40 and the first moving tube 53 of the first moving component set 50. It is used to avoid the separation of the first moving component set 50 and the second moving component set 60, thereby achieving the effect of preventing the mechanical protective components from separation. Preferably, when the bottom linkage rod 45 of the bottom layer component set 40 and the hollow connecting rod 55 of the first moving component set 50 are electrically controlled and calculated by the microcontroller 10 of the control unit 100 after a predetermined number of rotations, at this time, the microcontroller 10 of the control unit 100 electrically controls the motor 20 to stop running, so that the linkage assembly 30, the bottom linkage rod 45 of the bottom layer component set 40 and the hollow connecting rod 55 of the first moving component set 50 stop rotating.

Figure 5:
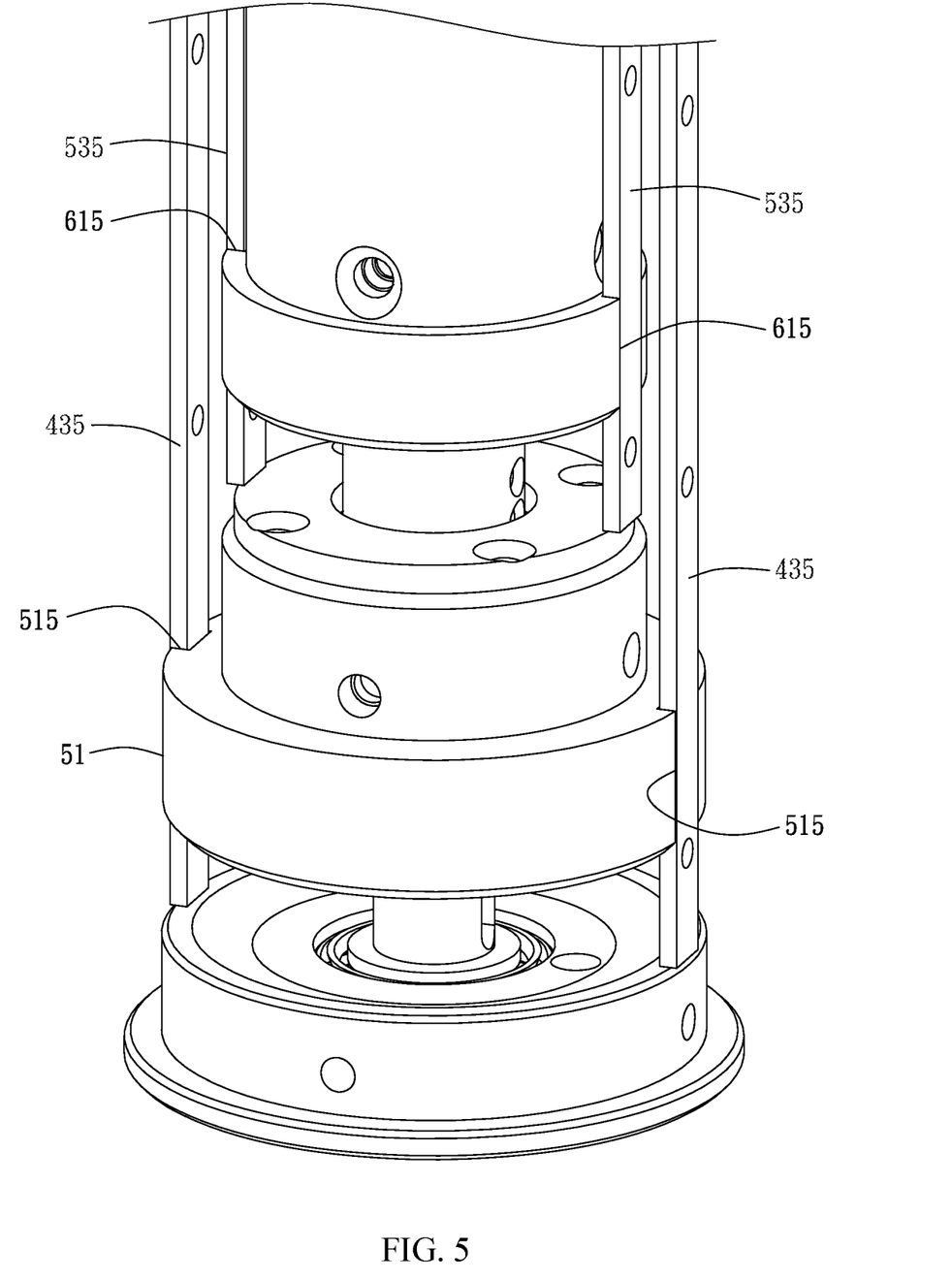
FIG. 5 is an enlarged and three-dimensional schematic diagram of part of the components of FIG. 1, which mainly exposes the connection relationship between the two guide grooves of the first moving component set and the two guide rails of the bottom layer component set, as well as the connection relationship between the two guide grooves of the second moving component set and the two guide rails of the first moving component set.
Figure 6:
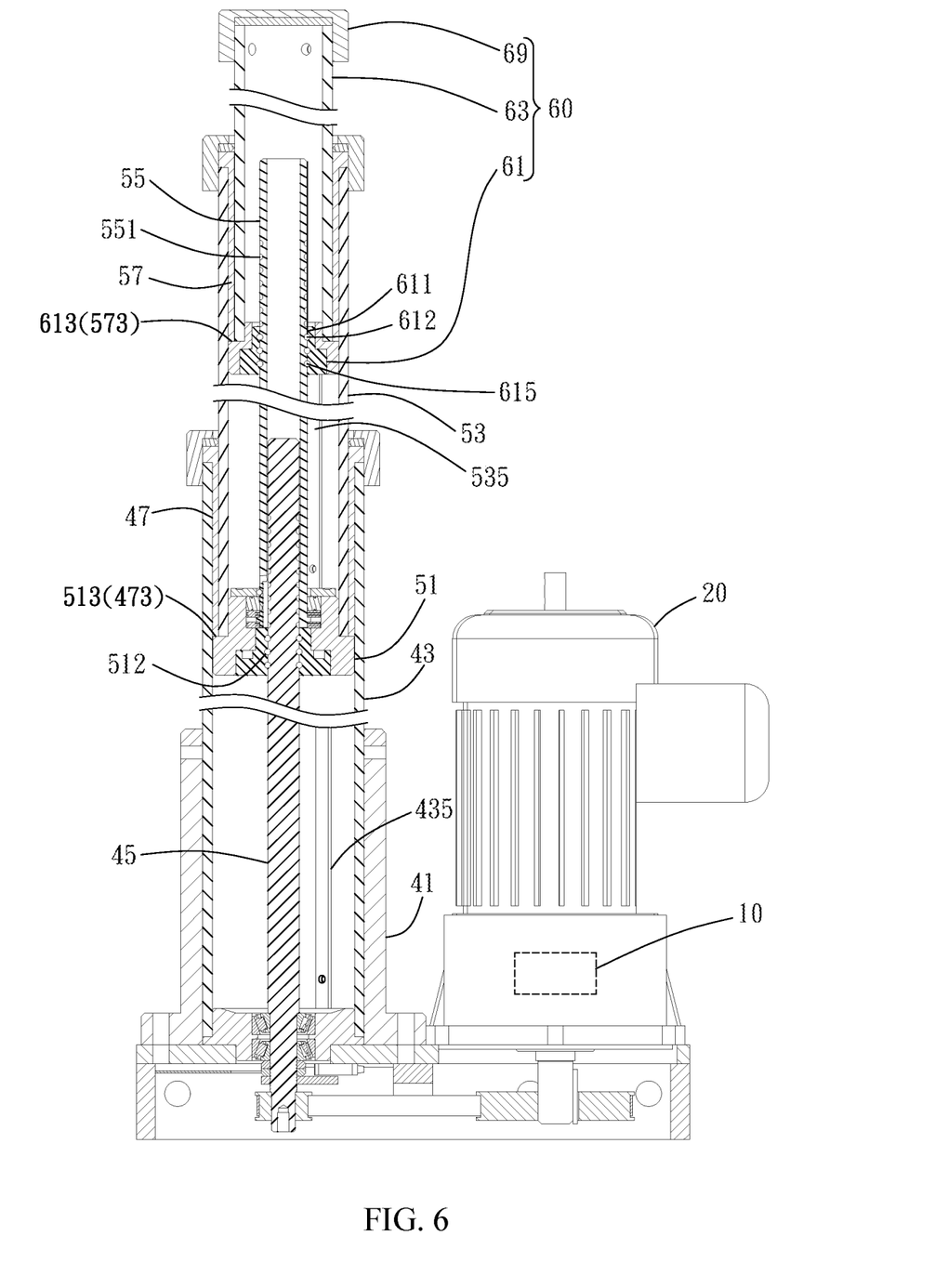
FIG. 6 is a cross-sectional front view of the lifting mast of the linkage type lifting mast system after being stretched.

Fourth, the linkage type lifting mast system 1 has a forced power-off mechanism. This means that after the control unit 100 is electrically activated again, the microcontroller 10 electrically controls the motor 20 to operate again, making the first moving base 51 of the first moving component set 50 and the second moving base 61 of the second moving component set 60 move gradually downwards synchronously along the axis direction of the bottom linkage rod 45 of the bottom layer component set 40 and the hollow connecting rod 55 of the first moving component set 50, so that the first moving tube 53 and the second moving tube 63 are also gradually folded downwards respectively, until the bottom of the first moving base 51 abuts against the base 41 of the bottom layer component set 40, and until the bottom of the moving base 61 abuts against the first moving base 51 of the first moving component set 50. Therefore, the first moving component set 50 and the second moving component set 60 will respectively return to the initial position in the support tube 43 of the bottom layer component set 40 and the initial position in the first moving tube 53 of the first moving component set 50. At this time, the controller 10 of the control unit 100 is used to electrically control and calculate the bottom linkage rod 45 of the bottom layer component set 40 and the hollow connecting rod 55 of the first moving component set 50 after another predetermined number of rotations, the microcontroller 10 of the control unit 100 generates a forced power-off signal to electrically control the motor 20 to stop running, so that the linkage assembly 30, the bottom linkage rod 45 of the bottom layer component set 40 and the hollow connecting rod 55 of the first moving component set 50 are stopped from rotating. This achieves the effect of forced power off.

Finally, it is worth mentioning that please refer to FIG. 1 and FIG. 2 again, if you want to stack up other moving components (that is, the structure is similar to the first moving component set 50 and the second moving component set 60 of the lifting mast disclosed in the present invention) upwards in the same connection mode, you only need to decrease the size from the lower layer to the upper layer in order, and the mobile component on the top layer does not need to include the first hollow rod. Therefore, the number of mobile components of the linkage type lifting mast disclosed in the present invention is not limited, and can be adjusted according to actual site requirements.

What is claimed is:
1. A lifting mast, comprising:
a bottom layer component set, said bottom layer component set comprising a base, a support tube, a bottom linkage rod, an inner bushing and an outer bushing, said bottom linkage rod being set on said base, said support tube being sleeved on said bottom linkage rod with a bottom end thereof set on said base, said support tube having an inner peripheral wall thereof provided with a guide rail that extends from said support tube along the axis of said support tube near the said base, said bottom linkage rod comprising a threaded section located on an outer surface thereof, said inner bushing of said bottom layer component set being set at a top of said support tube with a bottom end thereof set in said support tube, said outer bushing of said bottom layer component set being set on a top of said inner bushing of said bottom layer component set and an outer peripheral wall of said support tube;

a first moving component set, said first moving component set comprising a first moving base, a first moving tube, a hollow connecting rod and a plurality of balls, said first moving base being provided with a screw hole to be screwed to said threaded section of said bottom linkage rod of said bottom layer component set, said balls of said first moving component set being set between said screw hole of said first moving base of said first moving component set and said threaded section of said bottom linkage rod of said bottom layer component set, said first moving tube leaning against said first moving base, said first moving base having an outer peripheral wall thereof recessed to form a guide groove, said guide groove being embedded in said guide rail of said support tube of said bottom layer component set, said hollow connecting rod being set and screwed to said threaded section of said bottom linkage rod of said bottom layer component set and linked by the rotation of said bottom linkage rod, said hollow connecting rod having a bottom end thereof set in said first moving base, said first moving tube being provided with a guide rail at an inner peripheral wall thereof, said guide rail of said first moving tube extending from said first moving base along the axis of said first moving tube, said hollow connecting rod comprising a threaded section located on an outer surface thereof, said first moving tube of said first moving component set being set through said outer bushing and said inner bushing of said bottom layer component set and abutting on said first moving base; and a second moving component set, said second moving component set comprising a second moving base, a second moving tube and a plurality of balls, said second moving base being provided with a screw hole and used to screw said threaded section of said hollow connecting rod of said first moving component set, said balls of said second moving component set being set between said screw hole of said second moving base of said second moving component set and said threaded section of said hollow connecting rod of said first moving component set, said second moving tube abutting against said second moving base, said second moving base having an outer peripheral wall thereof recessed to form a guide groove, said guide groove being embedded in said guide rail of said first moving tube of said first moving component set.

2. The lifting mast as claimed in claim 1, wherein said guide rail of said support tube of said bottom layer component set abuts against the bottom end of said inner bushing.

3. The lifting mast as claimed in claim 2, wherein said first moving component set further comprises an inner bushing and an outer bushing, said inner bushing of said first moving component set being set on a top of said first moving tube with a bottom end thereof set in said first moving tube, said outer bushing of said first moving component set being placed on a top of said inner bushing of said first moving component set and an outer peripheral wall of said first moving tube, said second moving tube of said second moving component set being attached to said second moving base through said outer bushing of said first moving component set and said inner bushing of said first moving component set.

4. The lifting mast as claimed in claim 3, wherein said first moving base of said first moving component set ha an outer edge thereof protruded to form an annular protrusion; said first moving tube has a bottom end thereof abutted against said annular protrusion of said first moving base.

5. The lifting mast as claimed in claim 4, wherein said second moving base of said second moving component set has an outer edge thereof protruded to form an annular protrusion; said second moving tube has a bottom end thereof abutted against said annular protrusion of said second moving base.

6. The lifting mast as claimed in claim 3, wherein said guide rail of said first moving tube of said first moving component set abuts against the bottom end of said inner bushing of said first moving component set.

7. The lifting mast as claimed in claim 6, wherein said first moving base of said first moving component set ha an outer edge thereof protruded to form an annular protrusion; said first moving tube has a bottom end thereof abutted against said annular protrusion of said first moving base.

8. The lifting mast as claimed in claim 7, wherein said second moving base of said second moving component set has an outer edge thereof protruded to form an annular protrusion; said second moving tube has a bottom end thereof abutted against said annular protrusion of said second moving base.

9. The lifting mast as claimed in claim 1, wherein said first moving base of said first moving component set ha an outer edge thereof protruded to form an annular protrusion; said first moving tube has a bottom end thereof abutted against said annular protrusion of said first moving base.

10. The lifting mast as claimed in claim 9, wherein said second moving base of said second moving component set has an outer edge thereof protruded to form an annular protrusion; said second moving tube has a bottom end thereof abutted against said annular protrusion of said second moving base.

11. A lifting mast system, comprising a control unit and a lifting mast as claimed in claim 10, wherein said control unit comprises a microcontroller, a motor and a linkage assembly, said microcontroller of said control unit being electrically connected to and controlling said motor, said motor being connected to said linkage assembly, said linkage assembly comprising a connecting rod, a linking member and an offset gear, said connecting rod having one end thereof connected to said motor, said linking member being connected to an opposite end of said connecting rod and said offset gear, said bottom linkage rod of said bottom layer component set of said lifting mast meshing with said offset gear of said linkage assembly of said control unit, said microcontroller electrically controlling said motor to operate, so that said connecting rod of said linkage assembly drives said linking member and said offset gear to operate, in turn, said bottom linkage rod of said bottom layer component set of said lifting mast is electrically controlled by said microcontroller of said control unit to operate.

12. The lifting mast system as claimed in claim 11, wherein according to said bottom linkage rod of said bottom layer component set and said hollow connecting rod of said first moving component set, said microcontroller of said control unit is electrically controlled to stop said motor after a predetermined number of rotations, so that so that said linkage assembly, said bottom linkage rod of said bottom layer component set and said hollow connecting rod of first moving component set stop rotating.

13. The lifting mast as claimed in claim 2, wherein said first moving base of said first moving component set ha an outer edge thereof protruded to form an annular protrusion; said first moving tube has a bottom end thereof abutted against said annular protrusion of said first moving base.

14. The lifting mast as claimed in claim 13, wherein said second moving base of said second moving component set has an outer edge thereof protruded to form an annular protrusion; said second moving tube has a bottom end thereof abutted against said annular protrusion of said second moving base.

15. A lifting mast system, comprising a control unit and a lifting mast as claimed in claim 14, wherein said control unit comprises a microcontroller, a motor and a linkage assembly, said microcontroller of said control unit being electrically connected to and controlling said motor, said motor being connected to said linkage assembly, said linkage assembly comprising a connecting rod, a linking member and an offset gear, said connecting rod having one end thereof connected to said motor, said linking member being connected to an opposite end of said connecting rod and said offset gear, said bottom linkage rod of said bottom layer component set of said lifting mast meshing with said offset gear of said linkage assembly of said control unit, said microcontroller electrically controlling said motor to operate, so that said connecting rod of said linkage assembly drives said linking member and said offset gear to operate, in turn, said bottom linkage rod of said bottom layer component set of said lifting mast is electrically controlled by said microcontroller of said control unit to operate.

16. The lifting mast system as claimed in claim 15, wherein according to said bottom linkage rod of said bottom layer component set and said hollow connecting rod of said first moving component set, said microcontroller of said control unit is electrically controlled to stop said motor after a predetermined number of rotations, so that so that said linkage assembly, said bottom linkage rod of said bottom layer component set and said hollow connecting rod of first moving component set stop rotating.

\* \* \* \* \*